(No Model.)
W. E. FERGUSON.
THILL COUPLING.
No. 546,008. Patented Sept. 10, 1895.
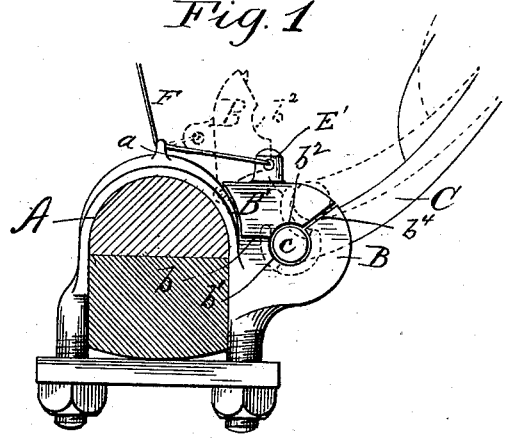
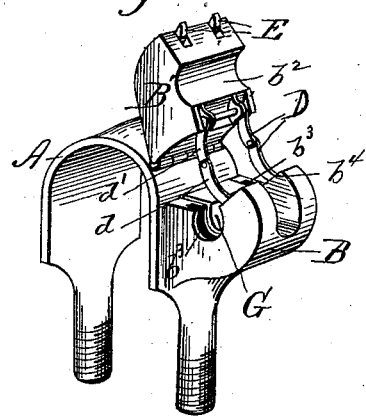 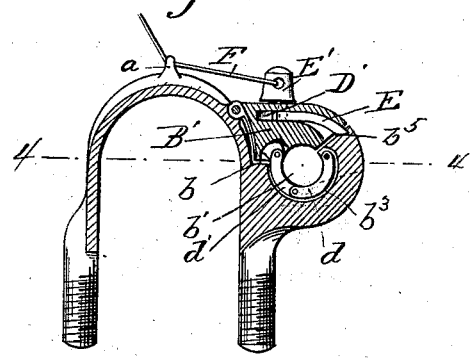
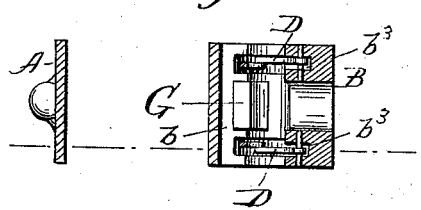
Witnesses,
Chas. W. Parker
Thomas D. Harris
Inventor,
William E. Ferguson
by ........
Attys.

UNITED STATES PATENT OFFICE.

WILLIAM EMMETT FERGUSON, OF LITTLE ROCK, ARKANSAS.

THILL-COUPLING.

SPECIFICATION forming part of Letters Patent No. 546,008, dated September 10, 1895.

Application filed July 1, 1895. Serial No. 554,611. (No model.)

*To all whom it may concern:*

Be it known that I, WILLIAM EMMETT FERGUSON, a citizen of the United States, residing at Little Rock, in the county of Pulaski and State of Arkansas, have invented certain new and useful Improvements in Thill-Couplers; and I do hereby declare the following to be a full, clear, and exact description of the invention, such as will enable others skilled in the art to which it appertains to make and use the same.

This invention relates to thill-couplers for vehicles, and more particularly to that class in which the coupling device may be operated at any time under emergencies to release the draft-animals from the vehicle.

The object of my invention is to adapt a vehicle to be fitted instantly with either thills or tongue or to permit of their ready interchange, and also to enable the driver of a vehicle to release or disconnect the draft animal or animals therefrom at any time without leaving his seat.

To this end the invention consists in the matters to be hereinafter described in detail, and then pointed out in the claims at the close of the specification.

In the accompanying drawings, Figure 1 is a side elevation of a shaft or thill coupler embodying my invention. Fig. 2 is a perspective view, the parts being shown in different positions. Fig. 3 is a vertical section showing the operating parts. Fig. 4 is a section on line 4 4 of Fig. 3.

I have shown my improved coupler as formed integral with an ordinary axle-clip A, and I prefer to so construct it for commercial reasons, though it may be made as a separate attachment, if preferred, and applied to a vehicle-axle in any convenient manner. As shown, the forward leg of the axle-clip A is provided with a boss B, having a transversely-arranged chamber $b$ in its upper surface, the forward part of the said chamber terminating at the bottom in a semicylindrical groove $b'$, designed to receive and afford a bearing for the cross-pin $c$ of a thill-iron C. This groove $b'$ is of a depth greater than half the diameter of the cross-pin $c$ and so shaped that the entire weight of the load in pulling or backing is exerted upon the solid boss B. Hinged to the clip A is a cover or block B', shaped to fill the chamber $b$ of the boss B, said block or cover being provided at its forward lower end with a transverse groove $b^2$, the contour of which is such as to form, in conjunction with the groove $b'$ of boss B, a cylindrical bearing for the cross-pin $c$ of the thill or pole iron C, as clearly shown in Fig. 1. The groove $b'$ of boss B is provided near each end with a channel $b^3$ for the reception of what I shall term an "ejector" D, consisting of curved links $d$ and $d'$, pivoted to the boss B and the cover B', and operating to throw the cross-pin $c$ of the thill-iron C positively from its bearing in said boss. The upper forward ends of the links $d$ are pivoted closely adjacent to the forwardly-inclined upper wall $b^4$ at the forward end of the boss B, their opposite ends being pivoted to the links $d'$, which are in turn pivoted to the cover B', (see Fig. 3,) so that upon raising said cover the links comprising the ejector D will be operated to positively raise the cross-pin $c$ of the thill-iron free from the groove $b'$ to the inclined surface or wall $b^4$, thus positively detaching said cross-pin $c$ from boss B of the clip or shackle A, as indicated in Figs. 1 and 2. To attach a thill-iron C to the shackle A the cross-pin $c$ would be placed as shown in dotted lines in Fig. 1 and the cover B' be closed down, the links of the ejector D carrying said cross-pin down within the groove $b'$. To insure against accidental release of the cross-pin from its bearing in the boss B, due to the vibration and jar incident to the travel of the vehicle, I provide the cover B' with bolts E, the forward ends of which engage recesses or keepers $b^5$, formed in the boss. It will be understood that so far as herein described bolts seated in the forward end of the boss B and engaging recesses in the cover B' would be the equivalent of the device illustrated. To further perfect this improved thill-coupler and enable the occupant of the vehicle to release the draft-animals without leaving the vehicle while the latter is in motion, I have arranged a leaf or coiled spring D' within the cover B' to exert a constant pressure upon the bolts E and thrust them outward to the locking position, also providing said bolts with an actuating thumb-piece or knob E', projecting to the exterior of the cover, by which said bolts may be forced rearward against stress of said spring. This actuating thumb-piece or knob is provided with a cord or chain F, leading rearward therefrom through an eye a, formed with or connected to the shackle A, and thence to some position in the vehicle readily accessible to the occupant thereof, so that in case of an emergency the occupant of the vehicle may by pulling upon said cord or chain F release the bolts E, raise the cover B', and thereby instantly and positively detach the thills or pole, and consequently the draft animal or animals, from the vehicle, thus insuring safety to the occupants or occupant of the vehicle.

In practice I prefer to employ two locking-bolts E, as shown in Fig. 2, and connect them by suitable cross-piece, to which the knob E' is attached; but this is not essential, as one or more of said bolts may be used.

My purpose in hanging the cover B' to the lug B is simply for convenience and to avoid possibility of mislaying or loss of cover; but it will be seen that the device would be operative for the purposes intended were the cover detachable from the base.

It will be noted that vehicles now in use can be fitted with my improved thill-coupler at very slight expense, as the only change necessary would be to substitute this coupler for the axle-clips or shackles ordinarily employed upon vehicles, and possibly to fit the thill or pole iron with a cross-pin, such as c, it being understood that large numbers of such irons now in use are so fitted and would require no change. To avoid rattling of the parts the usual rubber "antirattler" block G may be inserted in a recess in the boss B to impinge upon the cross-pin c of the thill-iron.

What I claim is—

1. The combination with a clip or shackle and a thill iron having a cross pin, of a recessed boss carried by the shackle and having a movable filling block or cover, a groove formed in the meeting faces of said boss and cover, and an ejector pivoted at one end of the boss and at its other end to the cover, substantially as described.

2. The combination with a clip or shackle and a thill iron having a cross pin or bolt, of a recessed boss carried by the shackle and having a hinged cover, a groove formed in the meeting faces of said boss and cover, and an ejector pivoted at one end to the boss and at the other end to the cover, substantially as described.

3. The combination with a clip or shackle and a thill iron having a cross pin or bolt, of a recessed boss carried by the shackle, a hinged cover adapted to fit the recess of the boss, the meeting faces of the recess and cover having a groove formed therein, an ejector pivoted at one end to the boss and at the other to the cover, and a locking bolt to secure the cover within the recess of the boss, substantially as described.

4. The combination with a clip or shackle and a thill iron having a cross pin or bolt, of a boss carried by the shackle and having a transverse groove, a cover also provided with a transverse groove, and an ejector comprising hinged links seated within channels formed through the groove of the boss, the ends of said ejector being pivoted to the boss and cover, and a spring pressed locking bolt to secure the cover to the boss, substantially as described.

5. The combination with a clip or shackle and a thill iron having a cross pin or bolt, of a recessed boss carried by said shackle and having a movable filling block or cover, a groove formed in the meeting faces of said recess and a cover, an ejector pivoted at one end to the boss and at the other to the cover, a bolt to secure the cover within the recess and a cord or chain connecting at one end to the bolt and leading through the eye of the shackle to the vehicle, substantially as described.

In testimony whereof I affix my signature in presence of two witnesses.

WILLIAM EMMETT FERGUSON.

Witnesses:
P. D. ENGLISH,
W. C. CAMPBELL.